United States Patent [19]

Smith

[11] 4,013,392

[45] Mar. 22, 1977

[54] INJECTION MOULDING MACHINES

[75] Inventor: Samuel Charles Henry Smith, Surbiton, England

[73] Assignee: G.K.N. Windsor Limited, Surrey, England

[22] Filed: May 3, 1974

[21] Appl. No.: 466,836

[30] Foreign Application Priority Data

May 8, 1973 United Kingdom ............ 21992/73

[52] U.S. Cl. ............................. 425/157; 425/167; 425/451.2; 425/DIG. 223

[51] Int. Cl.² ...................... B29C 3/06; B29F 1/06

[58] Field of Search ... 125/167, 156, 157, DIG. 223, 125/451.2

[56] References Cited

UNITED STATES PATENTS

| | | | |
|---|---|---|---|
| 2,724,145 | 11/1955 | Hall | 425/157 |
| 2,938,232 | 5/1960 | Martin | 425/DIG. 223 |
| 3,327,474 | 6/1967 | Schiffer | 425/DIG. 223 |
| 3,392,423 | 7/1968 | Heider et al. | 425/157 X |
| 3,587,135 | 6/1969 | Carrieri | 425/DIG. 223 |
| 3,616,495 | 11/1971 | Lemelson | 425/167 X |
| 3,671,162 | 6/1972 | Lohmann | 425/245 |
| 3,787,159 | 1/1974 | Bielfeldt | 425/167 |
| 3,799,720 | 3/1974 | Fjellman | 425/157 |

FOREIGN PATENTS OR APPLICATIONS

| | | |
|---|---|---|
| 1,285,787 | 8/1972 | United Kingdom ...... 425/DIG. 223 |
| 1,287,907 | 9/1972 | United Kingdom ...... 425/DIG. 223 |
| 1,318,009 | 5/1973 | United Kingdom ...... 425/DIG. 223 |

*Primary Examiner*—Robert L. Spicer, Jr.
*Assistant Examiner*—W. R. Briggs
*Attorney, Agent, or Firm*—Brisebois & Kruger

[57] ABSTRACT

In an injection moulding machine comprising two relatively movable platens each carrying a mould part, a stop means is provided which, in a first condition, defines a limit to the relative approach movement of the platens, and in a second condition permits further relative approach movement of the platens, means being provided to change the condition of the stop means from the first to the second condition at a predetermined instant after interruption of the relative approach movement of the platens by the stop means.

3 Claims, 2 Drawing Figures

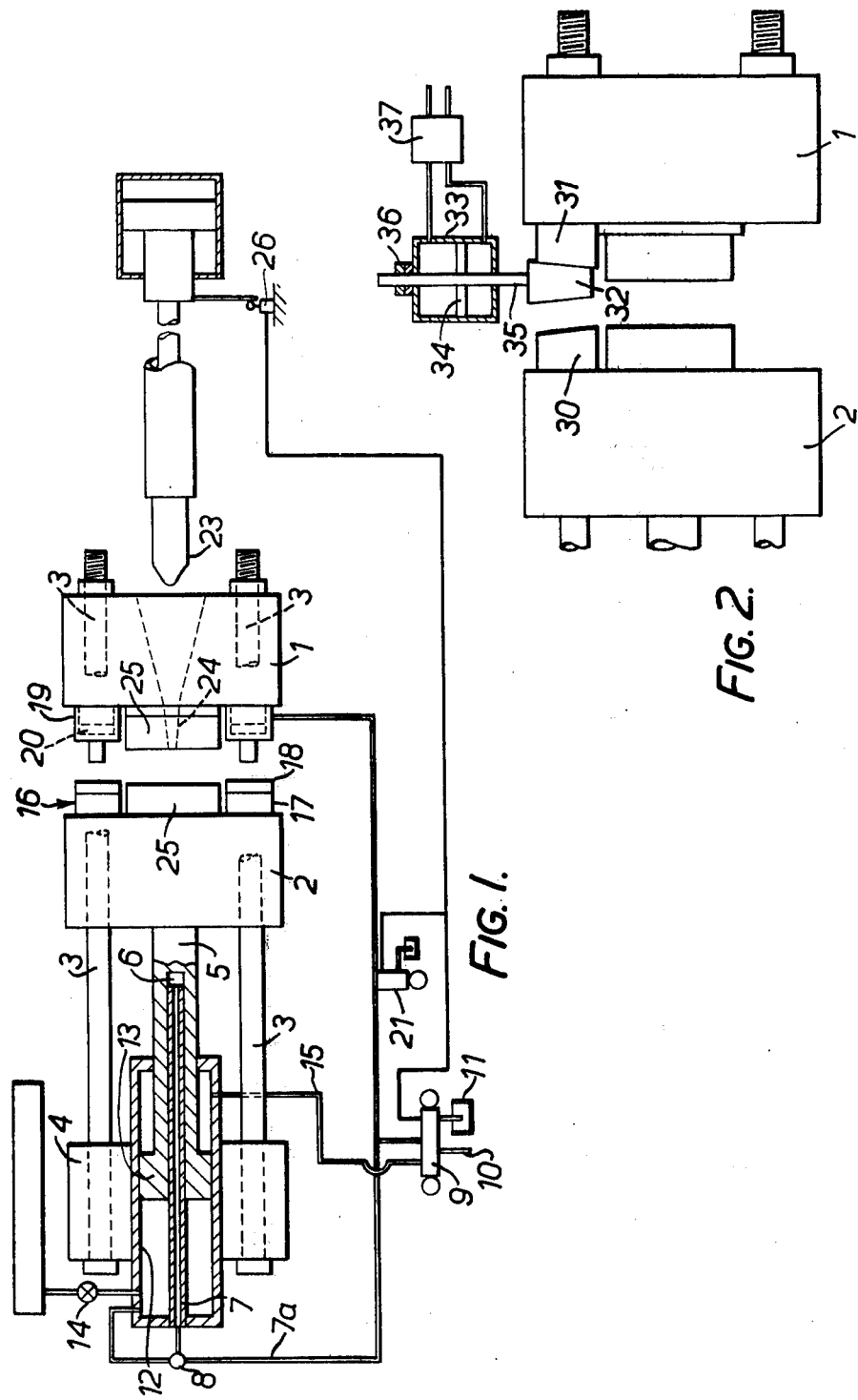

INJECTION MOULDING MACHINES

SUMMARY OF THE INVENTION

This invention is concerned with improvements in and relating to injection moulding machines. For certain applications it is desirable to bring a pair of platens to a first relative spacing at which a body of material may be injected into the space between two moulds carried by the platens and then to bring the platens to a closed condition under the full load of the hydraulic intensifier. To achieve accurate spacing is difficult.

According to the present invention there is provided an injection moulding machine comprising two relatively movable platens and stop means which in a first condition define a limit to the relative approach movement of the platens and in a second condition permit further relative approach movement of the platens, means being provided to change the condition of the stop means from the first condition to the second condition at a predetermined instant after interruption of the relative approach movement of the platens by the stop means.

Preferably the stop means and platen drive means are coupled during relative approach movement and before interruption thereof by the stop means to a common hydraulic fluid pressure source, the stop means providing from said source a greater effective force in opposition to the platen drive means until the condition of the stop means is changed by operation of control means to release said pressure from said stop means.

In a preferred arrangement the platen drive means includes a piston and cylinder assembly and the stop means includes at least one piston and cylinder assembly, the total effective area of the stop means exposed to the common source being greater than the effective area of the piston and cylinder assembly of the platen drive means.

The platen drive means may include a second piston and cylinder assembly, the movable part of which is fast with the movable part of the first piston and cylinder assembly and which is of greater effective area than the first piston and cylinder assembly of the platen drive means, the control means being operative to couple the second piston and cylinder assembly to the source upon release of pressure from the stop means, a reservoir being provided to maintain charged that part of the second piston and cylinder assembly to that side of the piston thereof which increases in volume during the platen relative approach movement.

In an alternative embodiment the stop means include a member movable transversely of the direction of relative movement of platens between the first condition in which it is in the path of opposed stops on the platens and the second condition.

The stop means are preferably adjustable to exactly set the limit at which the relative approach movement will be interrupted.

In order that this invention may be well understood, there will now be described embodiments thereof, given by way of example only, reference being had to the accompanying drawings, in which:

FIG. 1 is a diagrammatic part sectioned elevation of an embodiment of injection moulding machine; and FIG. 2 is a diagrammatic view partly in section of an alternative embodiment.

In FIG. 1, the machine comprises any suitable bed (not shown) on which is mounted a fixed platen 1, a movable platen 2 guided by guide bars 3 extending between the fixed platen and a fixed back member 4. The movable platen is moved by a ram 5, a bore 6 of which receives a feed tube 7 coupled through a line 7a and valve 8 to a control 9 which will selectively place tube 7 in communication with a hydraulic pressure source 10 or to drain 11. Valve 8 also communicates with a main cylinder 12 in which a main head 13 of ram 5 is received. The main cylinder 12 is in communication with a reservoir of hydraulic fluid via one-way valve 14. The other side of the main cylinder is coupled by a line 15 to control 9.

On the movable platen are stops 16, here shown as bosses 17, to which heads 18 are held by screws (not shown). Various shims may be inserted between the heads 18 and bosses 17 to vary the axial length of each stop. There are preferably four stops similar to stops 16 suitably distributed on platen 2.

On the stationary platen in the path of each stop is a cylinder 19 having a piston 20 the stem of which projects toward the stop. The cylinder 19 are coupled via a control valve 21 to line 7a. Alternatively, valve 21 is omitted, control 9 being operable to connect cylinders 19 to the hydraulic pressure source or drain.

The operation of the machine is as follows: the platens are initially spaced apart as shown; low pressure hydraulic fluid is pumped via control 9, line 7a and valve 8 to the tube 7 and to bore 6 of ram 5; pressure of the fluid advances ram 5 and platen 2, a low volume of fluid achieving the necessary platen displacement; main head 13 advances in cylinder 12 and fluid is displaced through line 15 to tank and is drawn from tank through valve 14; the pressure in line 7a is applied to cylinders 19 of which the pistons together have an area exposed to fluid pressure greater than the area of the end of bore 6 of ram 5; when the stops abut the piston stems, the movable platen is halted with the faces of the mould tools 25 carried by the platens spaced apart by a distance which is determined by the shims between heads 18 and bosses 17; the injection head 23, which may have been advanced at the commencement of the moulding run and remains forward or may have been advanced prior to the injection stroke and is retracted after the injection stroke, allowing when in the forward position synthetic plastics to be injected through runner 24 into the space between mould tools 25 carried by the platens; upon completion of the injection a sensing device 26 actuates control valve 21 to release the pressure in the cylinders 19 and actuates valve 8 to divert hydraulic pressure in the line 7a to the main cylinder 12 and the main head 13 thereby intensifying the load on ram 5; and the injected material is moulded under full pressure between the mould tools. It will be appreciated that the injected material is a rather stiff mastic so that substantial leakage thereof in the relatively short time between its injection and the closing of the mold is unlikely. Upon completion of the moulding stroke, sensed by a conventional cooling period process timer, valve 8 couples tube 7 and cylinder 12 to the line 7a and control 9 couples that line to drain 11; line 15 is coupled to the pressure source to return the ram 5 to its initial position and the parts on completion of the return stroke are reconnected for the next approach stroke of the platens.

The piston/cylinder assemblies 19, 20 provide accurate abutments for engagement by stops 16 which themselves are adjustable in length for accuracy. The platens can be halted in exact parallel relationship to give an accurate spacing for the injection. If desired the platens can be halted in a nonparallel attitude at the first spacing if any asymmetric injected body is desired. It will be appreciated that, in a modification, the stops 16 may be provided on platen 1 and assemblies 19; 20 on platen 2.

As should be obvious to those versed in the art, the object of the invention is to hold open the mould faces by abutment whilst synthetic material can be injected between the slightly open faces of the mould, than at a predetermined moment closing the mould under high pressure to press the synthetic material into the shape determined by the mould. The illustration shows this done by means of hydraulically operated mechanisms and circuitry. It should be noted, however, that pneumatic means or mechanical means, such as sliding wedges, could also be used to achieve the same object.

An alternative embodiment having stop means including one or more wedges is shown in FIG. 2 in which only the fixed platen 1 and movable platen 2 has been shown. Each platen is provided with a stop 30, 31 between which a wedge-shaped stop member 32 is positioned, the abutment faces of the stops being correspondingly inclined. The member 32 is movable transversely of the direction of movement of the platen 2 by a cylinder 33 and piston 34, of which the piston 34 is fast with the member 32. A rod 35 connects the piston 34 to the member 32 and extends through the cylinder 33. At that end of rod 35 remote from the member it bears a nut 36 which is adjustable along the rod to vary the innermost position of the member 32 and therefore the distance between the platens 1, 2 when the stops 30, 31 abut the member 32. If required, a plurality of members 32 and associated stops may be provided suitably distributed. The member 32 and stops 30, 31 effectively replace the stop 16, cylinder 19 and piston 20 of the embodiment of FIG. 1, the machine being otherwise as described with reference to FIG. 1.

The machine of FIG. 2 operates in a manner which is exactly similar to operation of the machine of FIG. 1 except that the movable platen 2 is initially halted by abutment of stops 30, 31 with member 32, which is in its innermost position. When the device 26 (FIG. 1) is actuated it not only operates valve 8 but also operates control means 37, which may form part of control 9, to reverse the connections of the cylinder 33 to the hydraulic pressure source and drain to cause the member 32 to be retracted a sufficient distance to allow the mould to close under full pressure.

In a modification of the embodiment of FIG. 2, a separate source of hydraulic or pneumatic power is used to operate cylinder(s) 33, the pressure of which need not be related to the pressure in ram 5 as resistance loading to the ram 13 will then only be relative to the angle of wedge 32.

I claim:
1. An injection moulding machine comprising:
 a first platen carrying a first mould tool;
 a second platen carrying a second mould tool;
 means associated with the first platen for moving the first platen towards the second platen to bring the first mould tool into engagement with the second mould tool, said moving means comprising a first piston and cylinder assembly having a first effective area and a second cylinder and piston assembly having a second effective area, greater than said first effective area, the cylinder of said first cylinder and piston assembly being fast with the piston of said second cylinder and piston assembly and the piston of said first cylinder and piston assembly being fast with the cylinder of said second cylinder and piston assembly;
 stop means mounted in the path of said first platen and comprising cylinder and piston means placeable in a first condition to define a limit to the relative approach movement of said mould tools and in a second condition to permit said mould tools to move into engagement, said stop means having a third effective area which is smaller than said second effective area and greater than first effective area; and
 control means connected to said cause fluid to be supplied to said first cylinder and piston assembly and to said cylinder and piston means of said stop means to move said mould tools to their limited position, to subsequently cause material to be injected between said mould tools, and to thereafter cause fluid to be supplied to said second cylinder and piston assembly and released from the cylinder of said stop means to move said mould tools into engagement.

2. An injection moulding machine according to claim 1 in which said first and second cylinder and piston assemblies and said cylinder and piston means of said stop means are supplied with fluid from a common hydraulic fluid pressure source.

3. An injection moulding machine according to claim 1 in which said control means are operative to couple said second cylinder and piston assembly to the source of fluid upon release of pressure from the cylinder and piston means of said stop means, a reservoir being provided to maintain charged that part of said second cylinder and piston assembly to that side of said piston thereof which increases in volume during the approach movement of said mould tools.

* * * * *